(12) United States Patent
Glenn

(10) Patent No.: US 9,335,440 B1
(45) Date of Patent: May 10, 2016

(54) RAIN GAUGE WITH ILLUMINATED FLOAT

(71) Applicant: Matthew S. Glenn, Lincoln, NE (US)

(72) Inventor: Matthew S. Glenn, Lincoln, NE (US)

( * ) Notice: Subject to any disclaimer, the term of this patent is extended or adjusted under 35 U.S.C. 154(b) by 274 days.

(21) Appl. No.: 14/250,895

(22) Filed: Apr. 11, 2014

(51) Int. Cl.
| G01W 1/00 | (2006.01) |
| G01W 1/14 | (2006.01) |
| G01F 15/00 | (2006.01) |
| E03B 3/02 | (2006.01) |
| G01F 23/02 | (2006.01) |

(52) U.S. Cl.
CPC .................. G01W 1/14 (2013.01); G01F 15/00 (2013.01); E03B 3/02 (2013.01); G01F 23/02 (2013.01)

(58) Field of Classification Search
CPC .......... G01W 1/14; G01F 15/00; G01F 23/02; E03B 3/02
USPC ............. 73/170.17, 170.21, 170.22; 116/227, 116/228
See application file for complete search history.

(56) References Cited

U.S. PATENT DOCUMENTS

| 5,038,606 | A | 8/1991 | Geschwender et al. |
| 7,152,468 | B1 | 12/2006 | Peterson |
| 7,401,508 | B1 | 7/2008 | Peterson |
| 7,536,907 | B1 | 5/2009 | Peterson |
| 7,543,493 | B2 | 6/2009 | Geschwender |
| 9,010,182 | B1 * | 4/2015 | Glenn ..................... G01W 1/14 73/170.22 |

* cited by examiner

*Primary Examiner* — Lisa Caputo
*Assistant Examiner* — Jonathan Dunlap
(74) *Attorney, Agent, or Firm* — Dennis L. Thomte; Thomte Patent Law Office LLC

(57) ABSTRACT

A rain gauge having an illuminated float. The float has a first light emitter and a first solar panel mounted on the upper side thereof. The float also has a second light emitter and a second solar panel mounted on the lower side thereof. A battery is positioned within the float which is electrically connected to the light emitters and the solar panels on the float.

10 Claims, 4 Drawing Sheets

RAIN GAUGE WITH ILLUMINATED FLOAT

BACKGROUND OF THE INVENTION

1. Field of the Invention

This invention relates to a rain gauge and more particularly to a rain gauge wherein the float thereof has illumination means associated therewith. More particularly, this invention relates to a rain gauge having an illuminated float to facilitate the observation of the same during periods of darkness.

2. Description of the Related Art

Many rain gauges have been previously provided and come in various shapes and forms. Further, many efforts have been made to facilitate the reading of the rainfall indicia on the rain gauges. For example, U.S. Pat. No. 5,038,606 discloses a "jumbo" rain gauge wherein the indicia thereon are enlarged so that the rainfall amount may be read from a distance. Although the rain gauge of the above-identified patent and other rain gauges of the prior art do enhance the readability of the indicia on the rainfall collection vessel, it is difficult, if not impossible to read the same or observe the rainfall level within the collection vessel during periods of darkness.

An improved rain gauge is described in U.S. Pat. No. 7,152,468. In U.S. Pat. No. 7,152,468, means is shown to illuminate the rain gauge during periods of darkness by remote control. Although the rain gauge disclosed and described in the '468 Patent represents an improvement in the rain gauge art, a further advance in the art is illustrated in U.S. Pat. No. 7,536,907.

The instant invention is represents a further improvement in the illuminated rain gauge art.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A rain gauge is disclosed comprising a transparent rain collecting vessel having measurement indicia thereon and a float associated therewith. The upper end of the vessel is open for collecting rainfall. The lower end of the vessel is closed by a plug. The float has a battery compartment formed therein for receiving a DC battery power source therein. The battery is recharged by a solar panel located on the upper side of the float. Preferably, a solar panel is also provided on the lower side of the float. At least one LED is positioned on the upper side of the float and is designed to not only illuminate the float but also to illuminate the indicia on the vessel. Preferably, at least one LED is also provided on the lower side of the float to further illuminate the indicia on the vessel and the float. Preferably, a second solar panel is provided on the lower side of the float to assist in recharging the battery within the float.

It is therefore a principal object of the invention to provide a rain gauge having an illuminated float.

A further object of the invention is to provide a rain gauge wherein the float thereof directs light upwardly and outwardly from the float onto the indicia on the vessel and which directs light downwardly and outwardly therefrom onto the indicia of the rain gauge.

A further object of the invention is to provide a rain gauge of the type described which is more economical of manufacture than other illuminated rain gauges.

A further object of the invention is to provide a rain gauge of the type described which is easily readable during periods of darkness.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
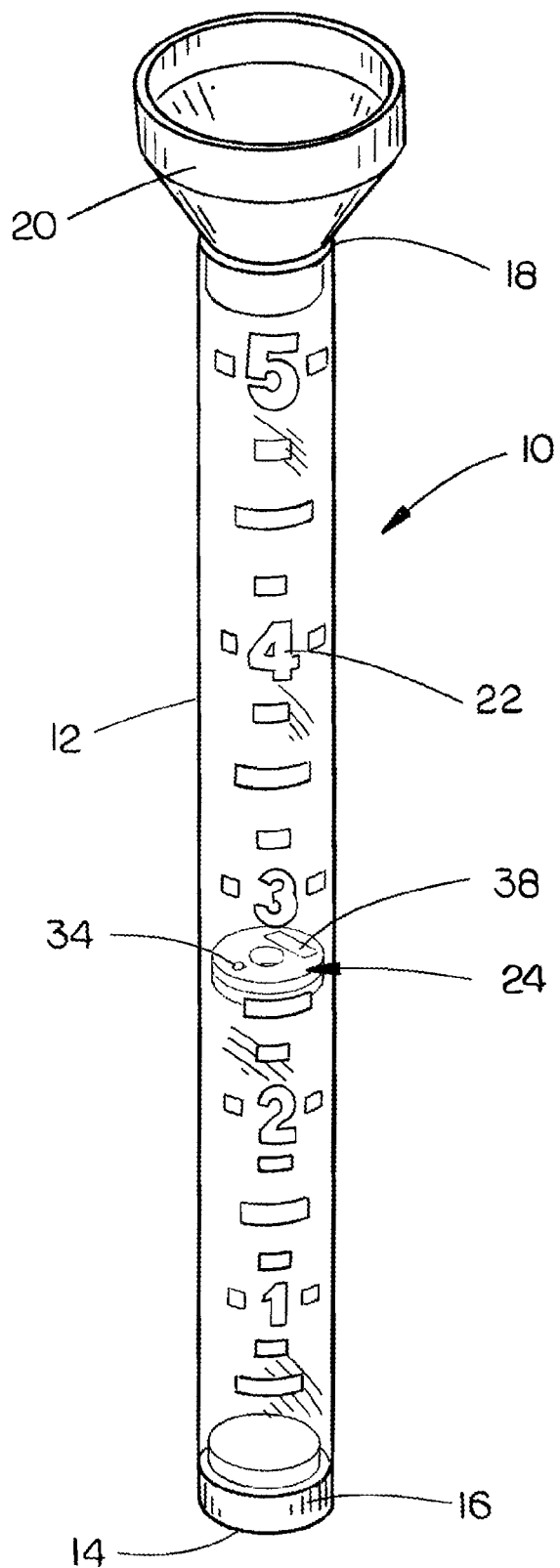
FIG. 1 is a perspective view of the rain gauge of this invention.
Figure 2:
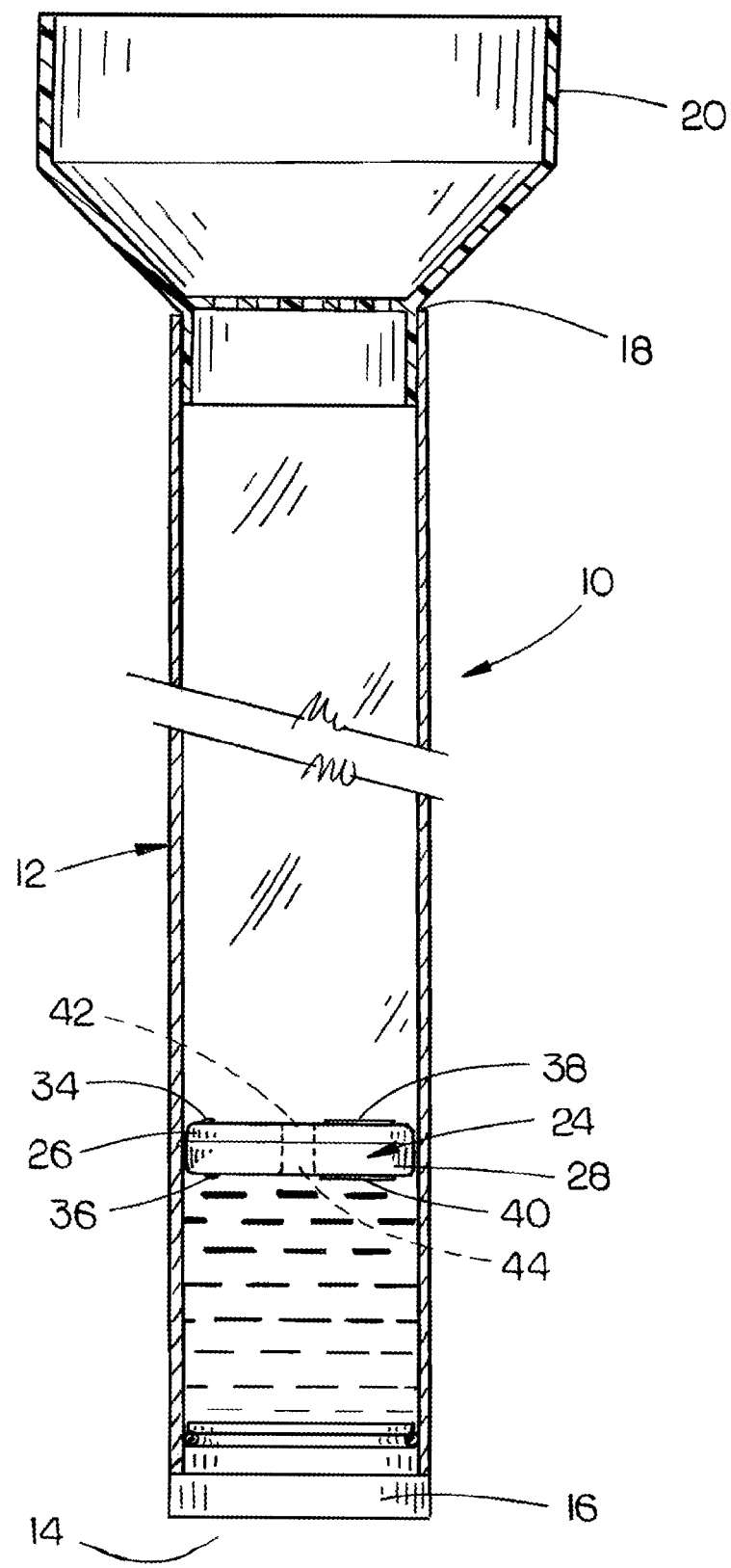
FIG. 2 is a partial sectional view of the rain gauge of this invention.
Figure 3:
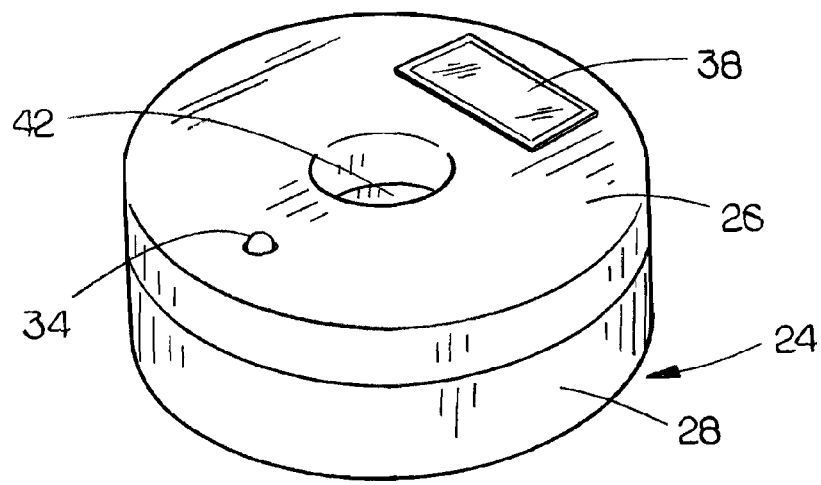
FIG. 3 is a perspective view of the illuminated float of this invention.
Figure 4:
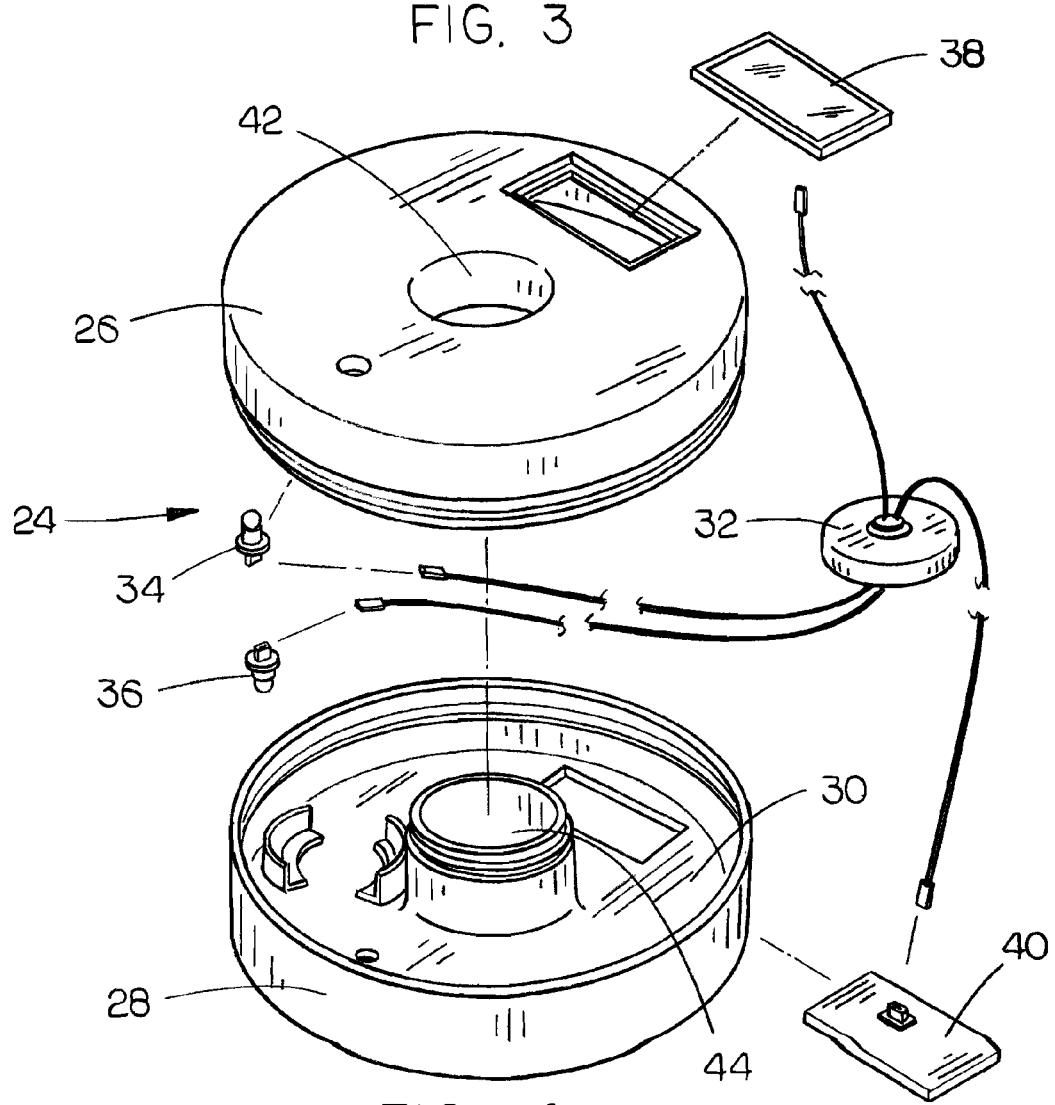
FIG. 4 is a partial exploded perspective view of the illuminated float of this invention.
Figure 5:
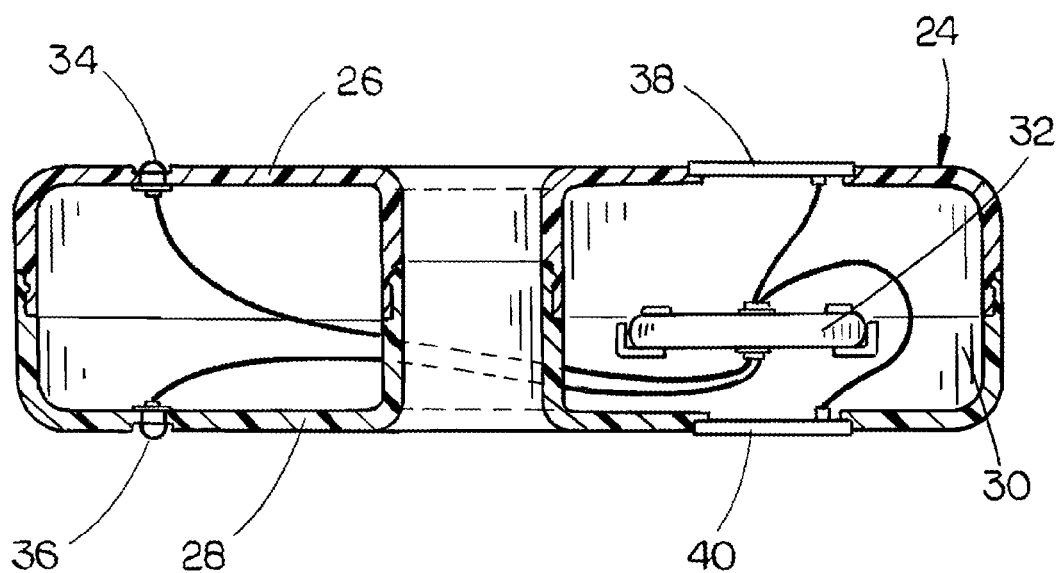
FIG. 5 is a sectional view of the illuminated float of this invention.
Figure 6:
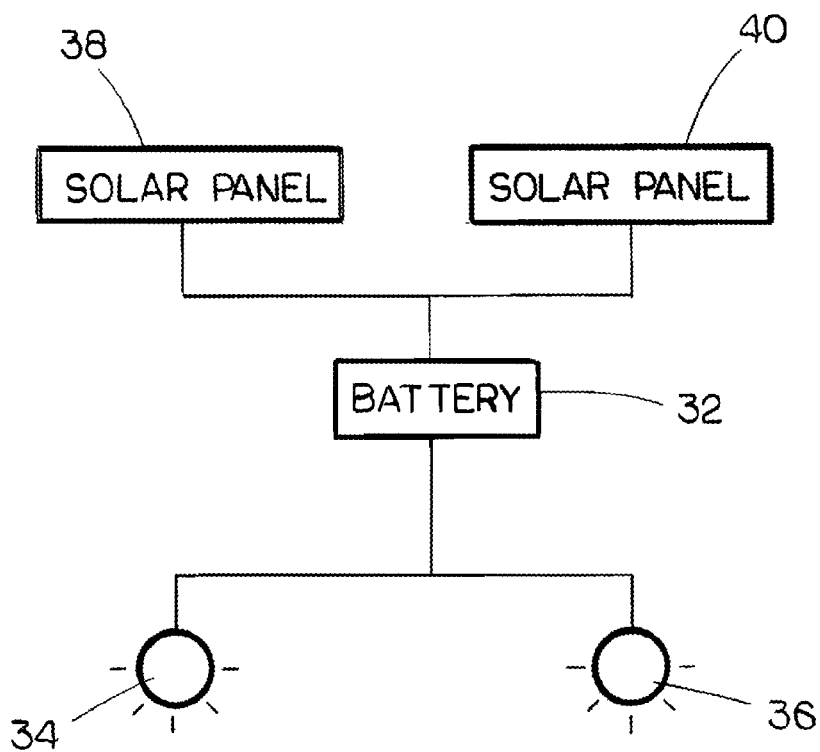
FIG. 6 is a schematic of the electrical circuit of the illuminated float of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The illuminated rain gauge of this invention is referred to generally by the reference numeral 10 and is similar to the rain gauges disclosed in the patents described above. The illumination means of this invention is designed to be used on the float of a large tubular or cylindrical rain gauge, sometimes referred to as a "Jumbo" rain gauge. The illuminated float of this invention may be used on smaller rain gauges.

Rain gauge 10 includes an elongated hollow collection vessel 12 which is preferably constructed of a transparent plastic material. Collection vessel 12 includes a lower open upper end 14 which is dosed by a plug 16. Vessel 12 also includes an upper end 18 having a funnel-shaped collector 20 mounted therein. The vessel 12 is provided with printed measurement indicia 22 thereon, as seen in the drawings, as well as a float 24.

Float 24 includes float members 26 and 28 which are screwed together to create a battery compartment 30 therein. Compartment 30 is adapted to receive a DC battery 32 therein. Battery 32 is electrically connected to a light emitter such as an LED 34 positioned on the upper side of float member 26. Battery 32 is also electrically connected to a light emitter such as an LED 36 positioned on the lower side of float member 28. A solar panel 38 is positioned on the upper side of float member 26 which is electrically connected to battery 32 to charge the same. A solar panel 40 is positioned on the lower side of float member 28 which is electrically connected to battery 32 to charge the same.

The light emitter 34 not only illuminates the upper side of float 24 but also illuminates the measurement indicia 22 on the vessel 12. The light emitter 34 not only illuminates the lower side of float 24 but also illuminates the measurement indicia 22 on the vessel 12. The light emitters 34 and 36 automatically turn on at night and turn off during the day in conventional fashion. Float members 26 and 28 may or may not have central openings 42 and 44 formed therein respectively.

Although the drawings illustrate a single light emitter 34 on the upper side of float member 26 and a single light emitter 36 on the lower side of float member 28, additional light emitters could be utilized if so desired. Further, the precise location of the light emitter 34 on the upper side of float member 26 may vary and the precise location of the light emitter 36 on the lower side of float member 28 may vary. Additionally, the precise location of the solar panel 36 on the upper side of float member 26 may vary and the precise location of the solar panel 40 on the lower side of float member 28 may vary.

The illuminated float 24 makes it very easy to not only observe the positions of the float 24 during periods of rainfall but also enables a person to read the indicia on the vessel.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An illuminated rain gauge, comprising:
   an upstanding transparent rain-collecting vessel having measurement indicia associated therewith;
   said vessel having an open upper end for collecting rainfall;
   said vessel having a closed lower end;
   a float having upper and lower sides positioned in said vessel;
   said float having an internal compartment formed therein;
   a DC battery positioned in said internal compartment;
   a first light emitter positioned on said upper side of said float which directs light upwardly therefrom to illuminate a portion of said vessel above said float;
   a second light emitter positioned on said lower side of said float which directs light downwardly therefrom to illuminate a portion of said vessel below said float;
   said first and second light emitters being electrically connected to said battery;
   a first solar panel positioned on said upper side of said float which is electrically connected to said battery; and
   a second solar panel positioned on said lower side of said float which is electrically connected to said battery.

2. The illuminated rain gauge of claim 1 wherein each of said first and second light emitters are light emitting diodes.

3. The illuminated rain gauge of claim 1 wherein said first and second light emitters illuminate the measurement indicia on said vessel.

4. The illuminated rain gauge of claim 1 wherein said first and second light emitters also illuminate said float.

5. An illuminated rain gauge, comprising:
   an upstanding transparent rain-collecting vessel having measurement indicia associated therewith;
   said vessel having an open upper end for collecting rainfall;
   said vessel having a closed lower end;
   a float having upper and lower sides positioned in said vessel;
   said float having an internal compartment formed therein;
   a DC battery positioned in said internal compartment;
   a first light emitter associated with said float to illuminate said float;
   said first light emitter being electrically connected to said battery; and
   a first solar panel positioned on said float which is electrically connected to said battery.

6. The illuminated rain gauge of claim 5 wherein said first light emitter also illuminates said vessel.

7. The illuminated rain gauge of claim 5 wherein said first light emitter is positioned on said upper side of said float and is electrically connected to said battery.

8. The illuminated rain gauge of claim 7 wherein a second light emitter is positioned on said lower side of said float and which is electrically connected to said battery.

9. The illuminated rain gauge of claim 5 wherein a second solar panel is positioned on said lower side of said float and which is electrically connected to said battery.

10. The illuminated rain gauge of claim 5 wherein said float is comprised of upper and lower float members which are selectively secured together.

\* \* \* \* \*